United States Patent
Yeo et al.

(10) Patent No.: US 8,286,241 B1
(45) Date of Patent: Oct. 9, 2012

(54) IDENTIFYING LEGITIMATE CONTENT USING USER-AGENT-BASED WHITE LISTING

(75) Inventors: Matthew Yeo, Los Angeles, CA (US); Jeffrey Wilhelm, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 232 days.

(21) Appl. No.: 12/553,010

(22) Filed: Sep. 2, 2009

(51) Int. Cl.
*H04L 29/06* (2006.01)
(52) U.S. Cl. ................ 726/22; 726/11; 726/26
(58) Field of Classification Search .......... 726/11, 726/22, 26
See application file for complete search history.

(56) References Cited

U.S. PATENT DOCUMENTS

| 2006/0288420 | A1* | 12/2006 | Mantripragada et al. ...... | 726/25 |
| 2009/0158430 | A1* | 6/2009 | Borders ......................... | 726/23 |
| 2009/0288169 | A1* | 11/2009 | Petta et al. .................... | 726/26 |

OTHER PUBLICATIONS

"Blacklist/Whitelist Module—ExpressionEngine Documentation," EllisLab, Inc., Copyright© 2002-2009, 4 pages [Online] [Retrieved on Dec. 7, 2009] Retrieved from the Internet <URL:http://expressionengine.com/docs/modules/blacklist/index.html>.

* cited by examiner

*Primary Examiner* — Jung Kim
*Assistant Examiner* — Ayoub Alata
(74) *Attorney, Agent, or Firm* — Fenwick & West LLP

(57) ABSTRACT

Known legitimate applications are analyzed to establish a list of trusted user-agent strings used by the applications to download content from a network. Traffic interception modules connected to the network examine traffic exchanged between clients and servers on the network, recognize traffic associated with downloads of content from the network, and create content download descriptions describing the downloads. The content download descriptions are analyzed to identify content downloads using the trusted user-agent strings. Identifiers of the content downloaded using the trusted user-agent strings are added to a white list of legitimate content. Access to the white list is provided to clients and the clients use the white list to identify legitimate content.

16 Claims, 5 Drawing Sheets

IDENTIFYING LEGITIMATE CONTENT USING USER-AGENT-BASED WHITE LISTING

BACKGROUND OF THE INVENTION

1. Field of the Invention

This invention pertains in general to computer security and in particular to detecting legitimate software.

2. Description of the Related Art

There is a wide variety of malicious software (malware) that can attack modern computers. Malware threats include computer viruses, worms, Trojan horse programs, spyware, adware, crimeware, and phishing websites. Malware can, for example, surreptitiously capture important information such as logins, passwords, bank account identifiers, and credit card numbers. Similarly, the malware can provide hidden interfaces that allow the attacker to access and control the compromised computer.

Modern malware is often targeted and delivered to only a relative handful of computers. For example, a Trojan horse program can be designed to target computers in a particular department of a particular enterprise. Such malware is difficult for security software to detect because there are fewer instances of the same malware, and the security software might not be configured to recognize it. Moreover, even mass-distributed malware is becoming harder to detect because the malware can contain polymorphisms designed to evade detection.

In response to the increasing difficulty of detecting malware, security software is evolving toward white list-based security. Under a white list approach, software appearing on a white list of known legitimate software is allowed to execute on the computer. Software not appearing on the white list is treated as suspicious and might be prohibited from executing.

However, it is difficult to maintain a white list. There is a large amount of legitimate software and making a comprehensive white list is a difficult task. Moreover, legitimate software can change in ways that cause it to no longer match its entry on the white list, such as when software automatically updates itself. If legitimate software does not appear on the white list, or no longer matches its corresponding entry, the security software can misclassify the legitimate software and generate false-positive malware detections. Therefore, there is a need for a way to generate a white list that minimizes or eliminates these drawbacks.

BRIEF SUMMARY

The above and other needs are addressed by a computer-implemented method, computer-readable storage medium, and computer system for providing security. Embodiments of the computer-implemented method comprise establishing a list of trusted user-agent strings used by legitimate applications in downloading content from locations on a network. The method further analyzes content download descriptions identifying content downloaded from the network and user-agent strings involved in the content downloads to identify content downloads using trusted user-agent strings. The method also adds identifiers of content downloaded from the network using trusted user-agent strings to a white list of legitimate content and provides a client with access to the white list of legitimate content. The client is adapted to use the white list to identify legitimate content at the client.

Embodiments of the computer-readable storage medium store executable computer program instructions for identifying legitimate content, the instructions comprising instructions for establishing a list of trusted user-agent strings used by legitimate applications in downloading content from locations on a network. The instructions further comprise instructions for analyzing the download descriptions identifying content downloaded from the network and user-agent strings involved in the content downloads to identify content downloads using trusted user-agent strings and adding identifiers of content downloaded from the network using trusted user-agent strings to a white list of legitimate content. The instructions additionally comprise instructions for providing a client with access to the white list of legitimate content.

Embodiments of the computer system comprise a computer-readable storage medium storing executable computer program instructions for identifying legitimate content and a processor for executing the computer program instructions. The instructions stored on the medium comprise instructions for establishing a list of trusted user-agent strings used by legitimate applications in downloading content from locations on a network. The instructions further comprise instructions for analyzing the download descriptions identifying content downloaded from the network and user-agent strings involved in the content downloads to identify content downloads using trusted user-agent strings and adding identifiers of content downloaded from the network using trusted user-agent strings to a white list of legitimate content. The instructions additionally comprise instructions for providing a client with access to the white list of legitimate content.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
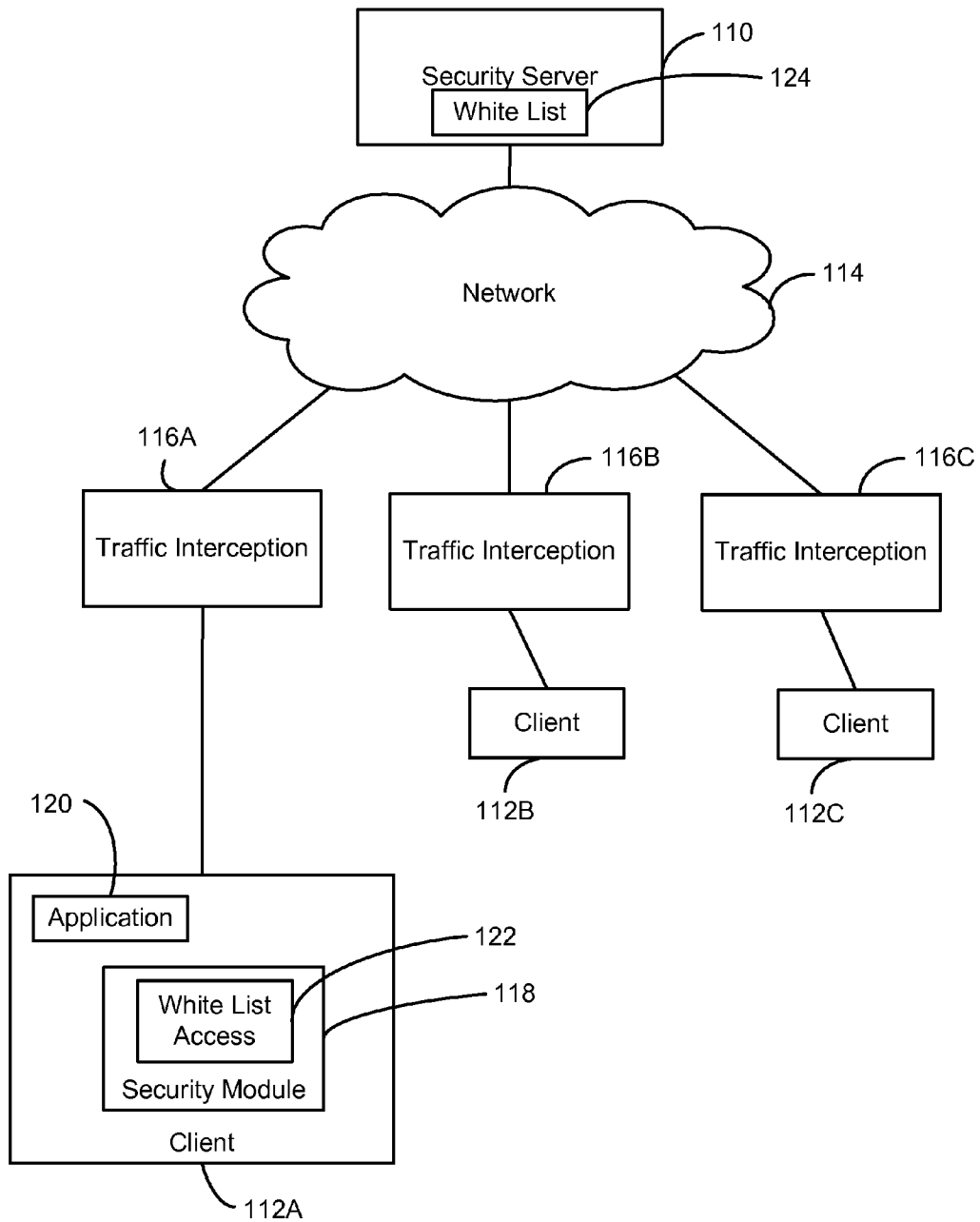
FIG. 1 is a high-level block diagram of a computing environment according to one embodiment.

FIG. 1 is a high-level block diagram of a computing environment 100 according to one embodiment. FIG. 1 illustrates a security server 110 and clients 112 connected by a network 114. Traffic interception modules 116 reside at locations having access to network traffic exchanged between the clients 112 and servers on the network 114. Three traffic interception modules 116 are illustrated in FIG. 1 in order to simplify and clarify the description. Embodiments of the computing environment 100 can have fewer or more such modules. In addition, only one client 112 is shown connected to each traffic interception module 116 even though some traffic interception modules are connected to many clients. Some embodiments also have multiple security servers 110.

FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A," "112B," and/or "112C" in the figures).

The network 114 represents the communication pathways between the security server 110, clients 112, traffic interception modules 116, and other entities on the network. In one embodiment, the network 114 is the Internet and uses standard communications technologies and/or protocols. Thus, the network 114 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

In one embodiment, a client 112 is a computer used by one or more users to perform activities including browsing web sites on the network 114 and downloading, installing, updating, and/or executing applications. The client 112, for example, can be a personal computer executing a web browser such as MICROSOFT INTERNET EXPLORER that allows the user to retrieve and display content from web servers and other computers on the network 114. In other embodiments, the client 112 is a network-capable device other than a computer, such as a personal digital assistant (PDA), a mobile telephone, a pager, a television "set-top box," or any other device that encounters network traffic including executable content.

For clarity, FIG. 1 illustrates internal details of only client 112A. The other clients 112B, 112C can have similar internal details. The client 112A includes a security module 118 that provides security to the client by detecting malware and performing other security-related tasks. In one embodiment, the security module 118 detects applications, such as application 120, that are resident on the client 112A. Such applications 120 can be downloaded from a web site, for example. The security module 118 monitors the application 120 and detects whether the application contains malware. If an application is detected as malware, the security module 118 can report the detection and perform remediation and other related tasks.

An embodiment of the security module 118 includes a white list access module 122 for accessing a white list 124 of known legitimate applications and other content. "Legitimate" in this sense means "known to not contain malware." The white list 124 includes entries identifying the legitimate content. For example, the white list 124 can identify a legitimate application by specifying one or more content identifiers, such as digests formed using cryptographic hash functions, of the one or more executable files forming the application. The white list 124 can also contain other information that can be used to identify legitimate content. In one embodiment, the white list 124 contains a list of location identifiers, such as universal resource locators (URLs) or IP addresses, for trusted network locations. Content downloaded from trusted network locations is presumed to be legitimate. The security module 118 can provide preferential treatment to legitimate content, such as letting legitimate applications perform behaviors that might be flagged as suspicious (i.e., possibly malicious) if performed by applications of undetermined legitimacy.

The white list 124 can be stored at the security server 110 or at the client 112. In an embodiment where the white list is stored at the security server 110, the white list access module 122 sends a content or location identifier to the security server 110 and receives a response indicating whether the identified content or location is on the white list 124. If the white list 124 is stored locally at the client 112, the white list access module 122 can look up the content or location identifier in the local white list to determine whether the identified content/location is legitimate.

The application 120 includes one or more executable files that can execute on the client 112A as one or more processes. The application 120 can be, for example, a web browser, word processing program, or media player. Assume for purposes of this description that the application 120 includes functionality for updating itself via the network 114. The application 120 performs the update by downloading content such as one or more files from a server on the network 114. The application 120 uses HTTP to access the content at a location on the server identified by a URL. When the application 120 contacts the server using HTTP, the application sends a text string in the "User-Agent" header field of the HTTP request that identifies the application (i.e., the user-agent) to the server. This string is called the "user-agent string."

The traffic interception modules 116 intercept network traffic and identify user-agent strings used in the downloading of content by clients 112. In one embodiment, the traffic interception modules 116 are deployed at high traffic network flow points. For example, a traffic interception module 116 can be located at a corporate gateway, within an Internet Service Provider (ISP), at a hosting provider, or on a popular web server. Instances of the traffic interception module 116 can execute on a dedicated hardware device and/or can be integrated into a router or other network device.

A traffic interception module 116 examines HTTP traffic flowing through it and identifies traffic associated with downloads of executable or other specified types of content. When the traffic interception module 116 identifies a download of executable content, the module saves a description of the downloaded content. For example, the traffic interception module 116 can save an identifier of the downloaded content, save an identifier of the location from which the content was downloaded, save the user-agent string used in the request for the download, and save an identifier of the source of the request for the content.

The security server 110 uses the saved descriptions of downloaded content to generate the white list 124. In one embodiment, the security server 110 is operated by a security software provider, and can be operated by the same entity that provides the security modules 118 to the clients 112 and operates the traffic interception modules 116.

The security server 110 receives the saved descriptions of downloaded content from the traffic interception modules 116 and analyzes the saved descriptions to identify downloads made using trusted user-agent strings. Trusted user-agent strings are strings that are used by applications known to be legitimate. The security server 110 generates the white list 124 based on the identified downloads that used trusted user-agent strings. In one embodiment, the security server 110 determines the content identifiers and location identifiers involved in the HTTP requests that used trusted user-agent strings. These content and location identifiers are incorporated into the white list 124. The white list 124 may also include content and location identifiers that are derived from techniques other than examination of user-agent strings. The security server 110 provides the clients 112 with access to the white list 124 by, for example, responding to queries from the client security modules 118 with values indicating whether identified content or locations are legitimate.

Thus, the security server 110 uses the information collected by the traffic interception modules 116 to generate a white list 124 accessible to the clients 112. Once a list of trusted user-agent strings is identified, the content and location identifiers used in connection with those user-agent strings are presumed legitimate and added to the white list 124. This technique allows for timely and automatic updates to the white list 124 as applications 120 on the clients 112 perform updates and/or perform other activities that involve retrieving content from the network 114. Having access to a current white list enhances the ability of the security modules 118 at the clients 112 to distinguish between legitimate and malicious applications and thereby detect malware. The white list 124 can also be used by clients that do not have their traffic intercepted.

Figure 2:
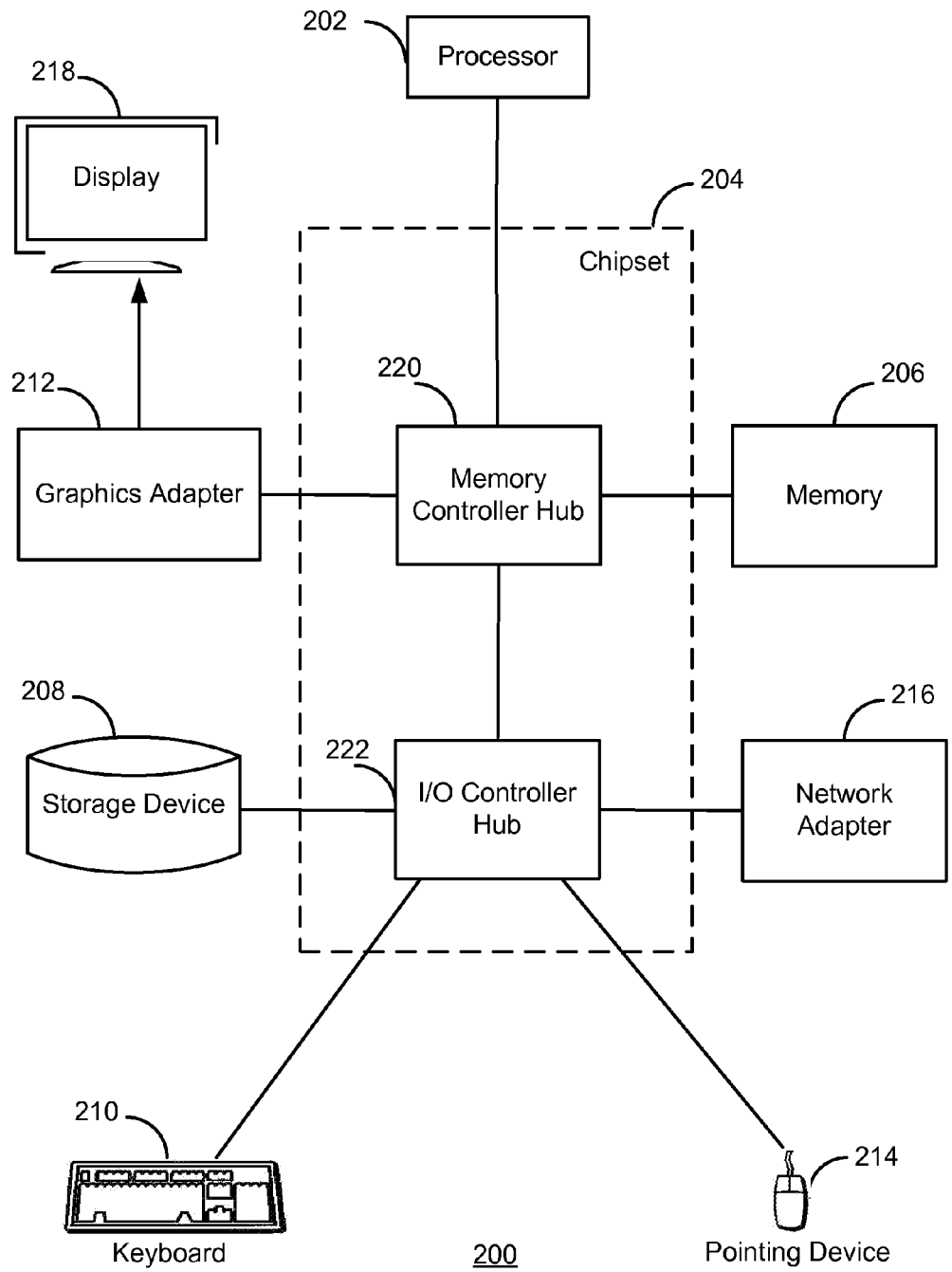
FIG. 2 is a high-level block diagram illustrating a typical computer for use as a security server, device for executing a traffic interception module, or client.

FIG. 2 is a high-level block diagram illustrating a typical computer 200 for use as a security server 110, device for executing a traffic interception module 116, or client 112. Illustrated are a processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an 110 controller hub 222. In another embodiment, the memory 206 is coupled directly to the processor 202 instead of the chipset 204.

The storage device 208 is any computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a reputation server 110 lacks a keyboard 210, pointing device 214, graphics adapter 212, and/or display 218. Moreover, the storage device 208 can be local and/or remote from the computer 200 (such as embodied within a storage area network (SAN)).

The computer 200 executes one or more operating systems such as a variant of MICROSOFT WINDOWS or LINUX. In general, the operating system executes one or more applications. The operating system and applications executed by the computer are formed of one or more processes. Thus, an application may be instantiated as a process executing under control of the operating system.

This description utilizes the term "module" to refer to computer program logic for providing a specified functionality. A module can be implemented in hardware, firmware, and/or software. A module is typically stored on a computer-readable storage medium such as the storage device 208, loaded into the memory 206, and executed by the processor 202. A module can include one or more processes, and/or be provided by only part of a process.

Figure 3:
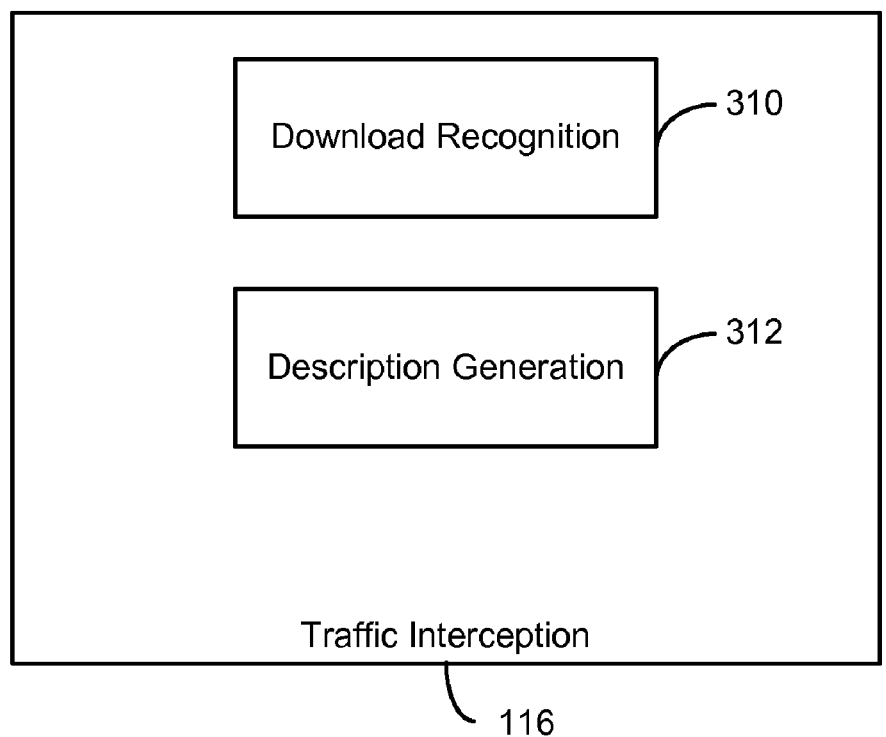
FIG. 3 is a high-level block diagram illustrating a detailed view of a traffic interception module according to one embodiment.

FIG. 3 is a high-level block diagram illustrating a detailed view of a traffic interception module 116 according to one embodiment. As shown in FIG. 3, the traffic interception module 116 itself includes multiple modules. Embodiments of the traffic interception module 116 can include other and/or different modules than the ones described here. In addition, the functionality attributed to the modules can be performed by other or different modules in other embodiments.

A download recognition module 310 recognizes network traffic indicating that a client 112 is downloading content such as an executable file. In one embodiment, the download recognition module 310 examines HTTP traffic passing between clients 112 and servers on the network 114. The download recognition module 310 identifies requests for particular types of content contained in the HTTP traffic, and also identifies content sent from servers to the clients 112 in response to the requests. In one embodiment, the download recognition module 310 identifies content that is executable and/or are likely to include executable content. The download recognition module 310 can identify such content based on file extensions of the content. For example, .EXE, .DLL, .ZIP, and .MSI are file extensions that indicate that the file may include executable content. The download recognition module 310 can also use other techniques to identify executable content, such as examining data within the files to detect byte patterns representative of executable content.

A description generation module 312 generates and saves descriptions of the recognized content downloads. A generated description can include an identifier of the downloaded content. In one embodiment, the content identifier is a digest of the content, such as a hash generated by applying a cryptographic hashing algorithm to the content. The generated description also includes an identifier of the location from which the content was downloaded, such as the URL or server IP address specified in the HTTP request for the content, and an identifier of the source of the request, such as the IP address of the requesting client 112.

In addition, the generated description includes the user-agent string associated with the HTTP request. As mentioned above, a user-agent string is contained in the header field of the HTTP request from a client 112 and identifies the application that issued the request. For historical reasons, many web browsing applications include the term "Mozilla" in their user agent strings. However, other types of applications often use different user-agent strings that serve to uniquely identify the applications, such as "Adobe Update Manager," "Nokia PC Suite Update Manager," "Windows-Update-Agent," and "Microsoft Office/12.0." Thus, the user-agent string can serve as an identifier of the application 120 that issued the download request.

The description generation module 312 saves the generated descriptions to the traffic interception module 116. In one embodiment, the description generation module 312 periodically provides the saved descriptions to the security server 110. In another embodiment, the description generation module 312 saves the descriptions to a location on the traffic interception module 116 known the security server 110, and the security server 110 periodically retrieves the descriptions from the traffic interception module.

Figure 4:
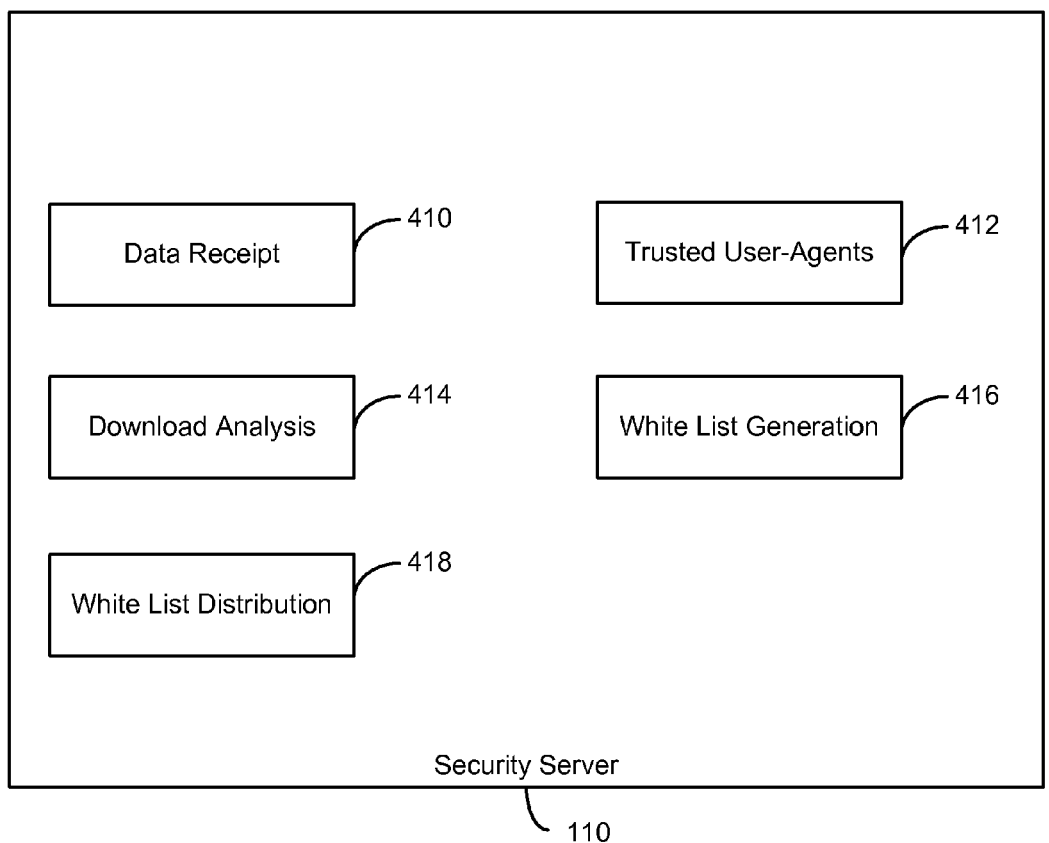
FIG. 4 is a high-level block diagram illustrating a detailed view of the security server according to one embodiment.

FIG. 4 is a high-level block diagram illustrating a detailed view of the security server 110 according to one embodiment. As shown in FIG. 4, the security server 110 includes multiple modules. Embodiments of the security server 110 can include other and/or different modules than the ones described here. In addition, the functionality attributed to the modules can be performed by other or different modules in other embodiments.

A data receipt module 410 receives the content download descriptions from the traffic interception modules 116. The data receipt module 410 can receive descriptions pushed from the traffic interception modules 116 and/or can pull the descriptions from the traffic interception modules, depending upon the embodiment. The data receipt module 410 stores the descriptions on the security server 110.

A trusted user-agents module 412 stores a list of trusted user-agent strings. This list can be created by analyzing known legitimate applications to identify the user-agent strings used by the applications when requesting content from the network 114. Similarly, the list can be created by examining network traffic to identify user-agent strings used to request content from trusted network locations. The identified user-agent strings are added to the list stored by the trusted user-agents module 412.

A download analysis module 414 analyzes content download descriptions in view of the trusted user-agent strings to identify downloads using trusted user-agent strings. For each such download, the download analysis module 414 determines the content identifier and location identifier associated with the HTTP request that used the trusted user-agent string. The download analysis module 414 analyzes the content and location identifiers to determine the identifiers that are commonly associated with given trusted user-agent strings. For example, the download analysis module 414 can determine that a particular file identified by a content identifier is frequently downloaded using a particular trusted user-agent string. Similarly, the download analysis module can determine that a particular network location (e.g., URL or IP address) identified by a location identifier is frequently accessed by requests using a particular trusted user-agent string.

The download analysis module 414 can also analyze the source identifiers contained in the content download descriptions to determine the number of unique clients 112 that generated the download requests. For example, the download analysis module 414 can determine the number of unique clients that made a request for particular content using a particular trusted user-agent string. Likewise, the download analysis module 414 can determine the number of unique clients that downloaded content from a particular network location using a particular trusted user-agent string.

A white list generation module 416 uses the results of the download analyses to generate the white list 124. In general, the white list generation module 416 adds content and location identifiers associated with trusted user-agent strings to the white list 124. In some embodiments, the white list generation module 416 incorporates a content or location identifier into the white list 124 only after a threshold number of unique clients 112 are observed to request the content and/or access the location. For example, the white list generation module 416 can use the results of the analyses conducted by the download analysis module 414 to determine the number of unique clients that requested identified content at an identified location using a trusted user-agent string, and add the content and location identifiers to the white list 124 if at least 1,000 clients 112 are observed to make the request. The addition of content and location identifiers to the white list 124 can occur automatically without manual intervention. Thus, the white list 124 can be continuously updated in response to analyses performed by the download analysis module 414.

A white list distribution module 418 provides the clients 112 with access to the white list 124. In one embodiment, the white list distribution module 418 includes a web server or similar technology that allows the module to receive, and respond to, queries from the clients 112. For example, the white list distribution module 418 can receive a query from a client 112 including a content or location identifier and asking whether the identified content or location is on the white list 124. The white list distribution module 418 responds to the query by providing one or more values indicating whether the content/location is on the white list 124. In another embodiment, the white list distribution module 418 distributes a full or partial white list to the clients 112 to allow the clients to detect legitimate software without querying the security server 110. This distribution can occur at prescheduled times and/or on demand, and can occur via push or pull in different embodiments.

Figure 5:
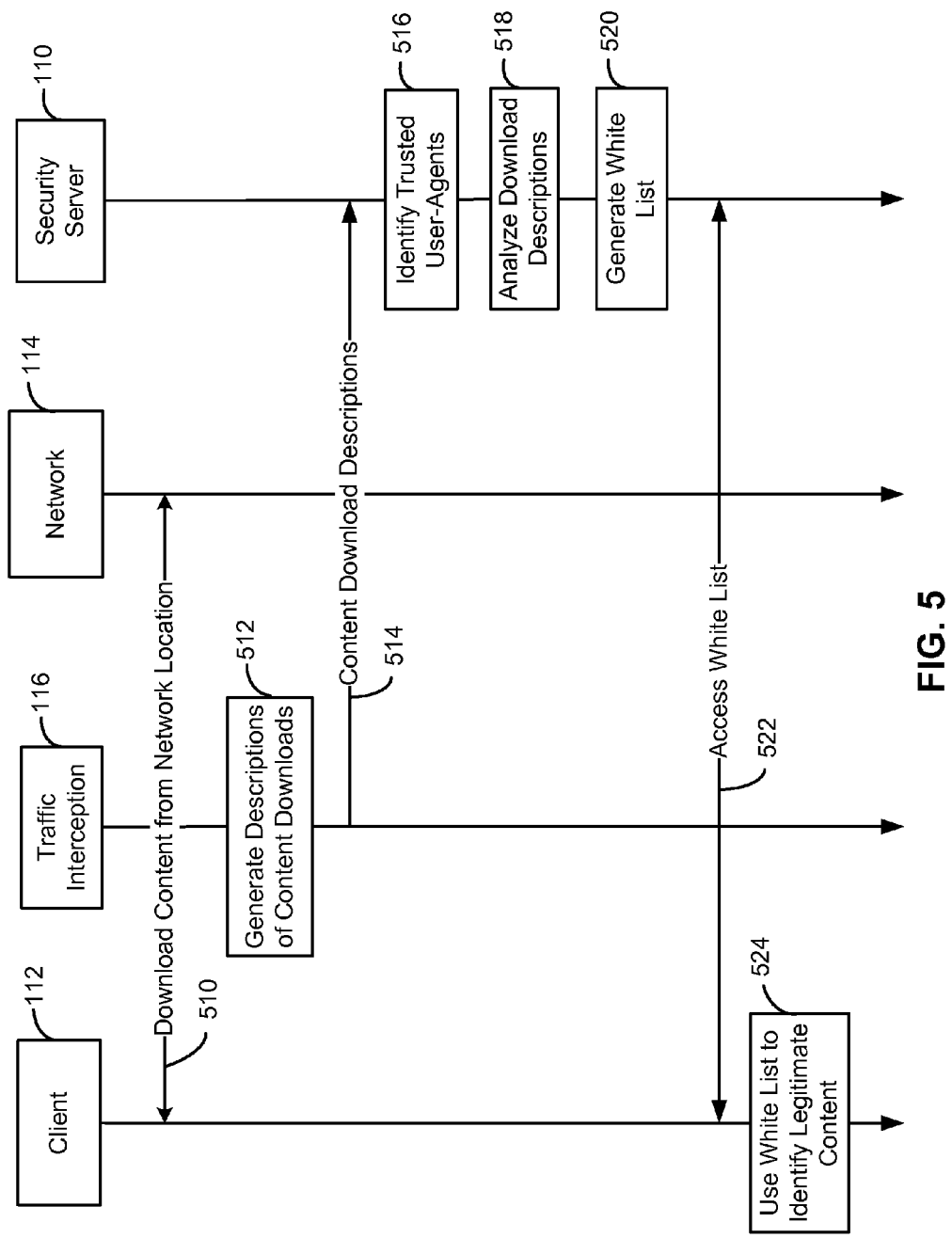
FIG. 5 is a sequence diagram illustrating the steps involved in using user-agent white listing to identify legitimate content according to one embodiment.

FIG. 5 is a sequence diagram illustrating the steps involved in using user-agent white listing to identify legitimate content according to one embodiment. In the diagram, four vertical lines respectively represent a client 112, traffic interception module 116, network 114, and security server 110. Time flows from the top to the bottom of the figure and the horizontal lines between the entities represent communications. Boxes on the vertical lines represent activities performed by the associated entity. Other embodiments can perform the steps of FIG. 5 in different orders. Moreover, other embodiments can include different and/or additional steps and communications than the ones described here.

An application 120 at the client 112 downloads 510 content from a location on the network 114 using an HTTP request. The HTTP request specifies the location of the content and includes a user-agent string. The traffic interception module 116 examines network traffic between clients 112 and the network 114 and recognizes the content download by the application 120. The traffic interception module 116 generates 512 content download descriptions for the recognized content downloads. A description includes identifiers of the content, location of the content, and source of the request, and the user-agent string associated with the request.

The traffic interception module 116 provides 514 the content download descriptions to the security server 110. The security server 110 examines the content download descriptions to identify 516 content downloads using trusted user-agent strings. This identification 516 can be performed by examining content requests from known legitimate applications to identify trusted user-agent strings, and searching the content download descriptions for downloads that used those trusted user-agent strings. The security server 110 analyzes 518 the download descriptions that used the trusted user-agent strings to determine the content and location identifiers that are commonly associated with given trusted user-agent strings. The security server 110 generates 520 a white list 124 of information that can be used to distinguish legitimate applications. The white list 124 can include the content and location identifiers associated with trusted user-agent strings.

The security server 110 provides 522 the security modules 118 of the clients 112 with access to the white list. For example, the security modules 118 can query the security server 110 to determine whether identified content is on the white list 124. The security modules 118 use 524 the white list 124 to identify known legitimate content and/or network locations. With this knowledge, the security modules 118 can reduce false positive detections of malware. Likewise, the security module 118 can devote increased resources to determining whether malware resides in applications of, or in content downloaded from network locations of, undetermined legitimacy.

Other embodiments vary from the embodiments described above. In one embodiment the functions of the traffic interception module 116 are performed at the clients 112. For example, the traffic interception module 116 is incorporated into the client security modules 118 and examines network traffic exchanged between the client 112 and the network 114 to recognize content downloads. In another variation, the security server 110 provides the list 412 of trusted user-agent strings to the traffic interception modules 116. The traffic interception modules 116 uses the list 412 to recognize content downloads using trusted user-agent strings and generate descriptions for these downloads that differ from descriptions of other types of downloads.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of identifying legitimate content comprising:
   establishing a list of trusted user-agent strings used by legitimate applications in downloading executable content from locations on a network;
   receiving content download descriptions from a plurality of traffic interception modules connected to the network, the traffic interception modules examining traffic exchanged between clients and servers on the network, recognizing traffic associated with downloads of executable content from the network, and creating content download descriptions identifying executable content downloaded from the network and user-agent strings involved in the executable content downloads;
   analyzing the content download descriptions to identify content downloads using trusted user-agent strings in the list;
   adding identifiers including digests of the executable content downloaded from the network using the trusted user-agent strings to a white list of legitimate content; and
   providing a client with access to the white list of legitimate executable content, wherein the client is adapted to use the white list to identify legitimate executable content at the client.

2. The method of claim 1, wherein establishing a list of trusted user-agent strings comprises:
   identifying an application known to be legitimate;
   observing a hypertext transport protocol (HTTP) request for content made by the known-legitimate application;
   determining a user-agent string contained in the HTTP request for content made by the known-legitimate application; and
   storing the determined user-agent string in the list of trusted user-agent strings.

3. The method of claim 1, wherein analyzing content download descriptions comprises:
   analyzing a content download description for an executable content download using a trusted user-agent string to determine an identifier of a network location from which the content was downloaded; and
   adding the identifier of the network location to the white list of legitimate content.

4. The method of claim 3, wherein the client is further adapted to determine that executable content downloaded from the network location identified by the identifier added to the white list is legitimate.

5. The method of claim 1, wherein adding identifiers including digests of executable content downloaded from the network using trusted user-agent strings to a white list of legitimate content comprises:
   analyzing content download descriptions for executable content downloaded using a trusted user-agent string to determine a number of unique sources of requests for the content; and
   adding an identifier of the executable content to the white list of legitimate content responsive to the number of unique sources of requests for the content exceeding a threshold.

6. A non-transitory computer-readable storage medium storing executable computer program instructions for identifying legitimate content, the instructions comprising instructions for:
   establishing a list of trusted user-agent strings used by legitimate applications in downloading executable content from locations on a network;
   receiving content download descriptions from a plurality of traffic interception modules connected to the network, the traffic interception modules examining traffic exchanged between clients and servers on the network, recognizing traffic associated with downloads of executable content from the network, and creating content download descriptions identifying executable content downloaded from the network and user-agent strings involved in the executable content downloads;
   analyzing the content download descriptions to identify content downloads using trusted user-agent strings in the list;
   adding identifiers including digests of executable content downloaded from the network using the trusted user-agent strings to a white list of legitimate content; and
   providing a client with access to the white list of legitimate executable content, wherein the client is adapted to use the white list to identify legitimate executable content at the client.

7. The computer-readable storage medium of claim 6, wherein establishing a list of trusted user-agent strings comprises:
   identifying an application known to be legitimate;
   observing a hypertext transport protocol (HTTP) request for content made by the known-legitimate application;
   determining a user-agent string contained in the HTTP request for content made by the known-legitimate application; and
   storing the determined user-agent string in the list of trusted user-agent strings.

8. The computer-readable storage medium of claim 6, wherein analyzing content download descriptions comprises:
   analyzing a content download description for an executable content download using a trusted user-agent string to determine an identifier of a network location from which the content was downloaded; and
   adding the identifier of the network location to the white list of legitimate content.

9. The computer-readable storage medium of claim 8, wherein the client is further adapted to determine that executable content downloaded from the network location identified by the identifier added to the white list is legitimate.

10. The computer-readable storage medium of claim 6, wherein adding identifiers including digests of executable content downloaded from the network using trusted user-agent strings to a white list of legitimate content comprises:

analyzing content download descriptions for content downloaded using a trusted user-agent string to determine a number of unique sources of requests for the content; and adding an identifier of the executable content to the white list of legitimate content responsive to the number of unique sources of requests for the content exceeding a threshold.

11. A computer system for identifying legitimate content, comprising:

a computer-readable storage medium storing executable computer program instructions comprising instructions for:

examining executable content download requests from legitimate applications known to not contain malware to identify user-agent strings used by the legitimate applications;

establishing, responsive to the examining, a list of trusted user-agent strings used by the legitimate applications to request executable content;

identifying executable content downloaded from the network using the trusted user-agent strings in the list by receiving content download descriptions from a plurality of traffic interception modules connected to a network, the traffic interception modules examining traffic exchanged between clients and servers on the network;

generating identifiers of the executable content downloaded from the network using trusted user-agent strings in the list, the identifiers including digests of the downloaded executable content;

adding the generated identifiers of the executable content downloaded from the network using trusted user-agent strings to a white list of legitimate executable content; and providing a client with access to the white list of legitimate executable content, wherein the client is adapted to use the white list to identify legitimate executable content at the client; and a processor for executing the computer program instructions.

12. The computer system of claim 11, wherein examining executable content download requests comprises:

identifying an application known to be legitimate;

observing a hypertext transport protocol (HTTP) request for executable content made by the known-legitimate application; and determining a user-agent string contained in the HTTP request for executable content made by the known-legitimate application.

13. The computer system of claim 11, wherein a digest of downloaded executable content comprises a cryptographic hash of the executable content.

14. The computer system of claim 11, further comprising determining an identifier of a network location from which executable content was downloaded using a trusted user-agent string in the list; and adding the identifier of the network location to the white list of legitimate executable content.

15. The computer system of claim 14, wherein the client is further adapted to determine that executable content downloaded from the network location identified by the identifier added to the white list is legitimate.

16. The computer system of claim 11, wherein adding the generated identifiers of the executable content downloaded from the network using trusted user-agent strings to a white list of legitimate executable content comprises:

determining a number of unique sources of download requests for a piece of executable content; and adding an identifier of the piece of executable content to the white list of legitimate content responsive to the number of unique sources of download requests for the piece of executable content exceeding a threshold.

\* \* \* \* \*